(12) United States Patent
Jung (10) Patent No.: US 12,200,094 B2
(45) Date of Patent: Jan. 14, 2025

(54) ELECTRONIC DEVICE AND METHOD FOR CONTROLLING SAME

(71) Applicant: LG ELECTRONICS INC., Seoul (KR)

(72) Inventor: Yoo Hyun Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 104 days.

(21) Appl. No.: 17/769,292

(22) PCT Filed: Oct. 30, 2019

(86) PCT No.: PCT/KR2019/014460
§ 371 (c)(1),
(2) Date: Apr. 14, 2022

(87) PCT Pub. No.: WO2021/085671
PCT Pub. Date: May 6, 2021

(65) Prior Publication Data
US 2023/0353342 A1    Nov. 2, 2023

(51) Int. Cl.
*H04L 7/02* (2006.01)
*H04L 7/00* (2006.01)
*H04L 7/027* (2006.01)

(52) U.S. Cl.
CPC ............ *H04L 7/027* (2013.01); *H04L 7/0012* (2013.01)

(58) Field of Classification Search
CPC ............................... H04L 7/027; H04L 7/0012

USPC .......................................................... 375/355
See application file for complete search history.

(56) References Cited

U.S. PATENT DOCUMENTS

| | | | | |
|---|---|---|---|---|
| 2014/0324199 | A1* | 10/2014 | Gu | G06F 16/60 700/94 |
| 2016/0373125 | A1* | 12/2016 | Pagnanelli | H03M 3/436 |
| 2017/0289231 | A1* | 10/2017 | Powell | H04N 21/440281 |

FOREIGN PATENT DOCUMENTS

| | | |
|---|---|---|
| KR | 1020140107148 | 9/2014 |
| KR | 1020180005907 | 1/2018 |
| KR | 1020180036756 | 4/2018 |
| WO | 03084239 | 10/2003 |
| WO | 2016108650 | 7/2016 |

OTHER PUBLICATIONS

PCT International Application No. PCT/KR2019/014460, International Search Report dated Jul. 22, 2020, 2 pages.

\* cited by examiner

*Primary Examiner* — Kevin M Burd
(74) *Attorney, Agent, or Firm* — LEE, HONG, DEGERMAN, KANG & WAIMEY (57) ABSTRACT

Disclosed are an electronic device and a method for controlling same. The disclosed electronic device re-samples data received from a first external electronic device, on the basis of the difference in speed between the clock speed of the first external electronic device and the clock speed of the disclosed electronic device, and transmits the re-sampled data to a second external electronic device.

9 Claims, 6 Drawing Sheets

ELECTRONIC DEVICE AND METHOD FOR CONTROLLING SAME

CROSS-REFERENCE TO RELATED APPLICATIONS

This application is the National Stage filing under 35 U.S.C. 371 of International Application No. PCT/KR2019/014460, filed on Oct. 30, 2019, the contents of which are all incorporated by reference herein in its entirety.

TECHNICAL FIELD

Disclosed herein is an electronic device that may prevent delay generated in transmitting data received from a first external electronic device to a second electronic device, and a method for controlling the same.

BACKGROUND ART

A display device is a device having a function of providing images that a user can watch. A user may watch a broadcast output on the display device. The display device may provide a broadcast selected by a user among broadcast signals transmitted from a broadcast station and a broadcast video may be displayed on a display. A TV is a typical example of a display device.

The display device may be connected to external electronic devices. The display device may transmit data received from one external electronic device to another external electronic device. However, when each of the external electronic devices forms communication via a protocol different from that of the display device, there is a disadvantage that a delay occurs due to a difference in the speeds of the protocols.

DESCRIPTION OF DISCLOSURE

Technical Problems

Accordingly, an object of the present disclosure is to address the above-noted and other problems and to provide an electronic device that may prevent a delay generated in transmitting data received from a first external electronic device to a second external electronic device, and a method for controlling same.

Another object of the present disclosure is to provide an electronic device that may perform streaming without delay even when there is a difference between performances of clock elements.

Aspects according to the present disclosure are not limited to the above ones, and other aspects and advantages that are not mentioned above can be clearly understood from the following description and can be more clearly understood from the embodiments set forth herein. Additionally, the aspects and advantages in the present disclosure can be realized via means and combinations thereof that are described in the appended claims.

Technical Solutions

An electronic device and a method for controlling the electronic device according to an embodiment of the present disclosure may re-sample data received from a first external electronic device based on a difference between a clock rate of the first external electronic device and a clock rate of the electronic device and transmit the re-sampled data to a second external electronic device.

An electronic device configured to transmit data received from a first external electronic device to a second external electronic device according to an embodiment of the present disclosure may include a first communication unit configured to receive data from the first external electronic device via communication based on a first protocol; a re-sampler configured to re-sample the received data; a second communication unit configured to transmit the re-sampled data via communication with the second external electronic device based on a second protocol; and a calculation unit configured to calculate a set value of the re-sampling based on a data transmission rate to the second external electronic device, a first time value and a second time value. The first time value may be calculated based on a clock count value of the first external electronic device at each of a first time point and a second time point and a clock rate of the first external electronic device, and the second time value may be calculated based on a clock count value of the electronic device at each of the first time point and the second time point and a clock rate of the electronic device.

An electronic device configured to transmit data received from a first external electronic device to a second external electronic device according to another embodiment of the present disclosure may include a first communication unit configured to receive data from the first external electronic device based on a first protocol in a state of being synchronized to a clock of the first external electronic device; a re-sampler configured to re-sample the received data; a second communication unit configured to transmit the re-sampled data to the second external electronic device based on a second protocol in a state of being synchronized to a clock of the electronic device; and a calculation unit configured to calculate a set value of the re-sampling based on a rate difference between a clock rate of the first external electronic device and a clock rate of the electronic device.

A method for controlling an electronic device configured to transmit data received from a first external electronic device to a second external electronic device may include a step of a first communication unit receiving data from the first external electronic device via communication based on a first protocol; a step of a calculation unit calculating a set value of the re-sampling based on a data transmission rate to the second external electronic device, a first time value and a second time value; controlling a re-sampler to re-sample the received data based on a set value of the re-sampling; and a step of a second communication unit transmitting the re-sampled data via communication with the second external electronic device based on a second protocol. The first time value may be calculated based on a clock count value of the first external electronic device at each of a first time point and a second time point and a clock rate of the first external electronic device, and the second time value may be calculated based on a clock count value of the electronic device at each of the first time point and the second time point and a clock rate of the electronic device.

Advantageous Effect

The electronic device according to the present disclosure may prevent delay generated in transmitting data received from the first external electronic device to the second external electronic device.

Further, the electronic device may perform streaming without delay even if there is a difference in performances of the clock elements.

Specific effects are described along with the above-described effects in the section of Detailed Description.

DETAILED DESCRIPTION OF EXEMPLARY EMBODIMENT

The above-described aspects, features and advantages are specifically described hereunder with reference to the accompanying drawings such that one having ordinary skill in the art to which the present disclosure pertains can easily implement the technical spirit of the disclosure. In the disclosure, detailed descriptions of known technologies in relation to the disclosure are omitted if they are deemed to make the gist of the disclosure unnecessarily vague. Below, preferred embodiments according to the disclosure are specifically described with reference to the accompanying drawings. In the drawings, identical reference numerals can denote identical or similar components.

The terms "first", "second" and the like are used herein only to distinguish one component from another component. Thus, the components should not be limited by the terms. Certainly, a first component can be a second component unless stated to the contrary.

It will be understood that when an element is referred to as being "connected with" or "coupled to" another element, the element can be directly connected with the other element or intervening elements may also be present. In contrast, when an element is referred to as being "directly connected with" another element, there are no intervening elements present.

Throughout the disclosure, each element may be singular or plural, unless stated to the contrary.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Throughout the disclosure, the terms "A and/or B" as used herein can denote A, B or A and B, and the terms "C to D" can denote C or greater and D or less, unless stated to the contrary.

A display device which will be described in the present disclosure may be, for example, an intelligent display device in which a computer support function is added to a broadcast reception function. Also, the display device may additionally have an internet function even while being faithful to a broadcast reception function, thereby having an interface that more conveniently used such as a handwritten input device, a touch screen or a spatial remote control. A display device may be connected to the internet and a computer with the support of a wired or wireless internet function, thereby being capable of performing functions such as e-main, web browsing, banking or games. A standardized general-purpose OS may be used for those various functions.

Accordingly, since various applications may be freely added to or deleted from the display device on a general-purpose OS kernel, a display device described in the present disclosure may perform various user-friendly functions. More specifically, a display device may be a network display device, an HBB display device, a smart display device, an LED display device, an OLED display device, and the like, for example, and may be applied to a mobile terminal in some examples.

A mobile terminal which will be described in the present disclosure may include a cellular phone, a smart phone, a laptop computer, a digital broadcasting terminal, a personal digital assistant (PDA), a portable multimedia player (PMP), a navigation system, a slate PC, a tablet PC, a ultra-book, a wearable device (e.g., a watch type terminal, that is, a smart watch, a glass type terminal, that is, a smart glass, a head mounted display (HMD)), etc.

Those skilled in the art to which the present disclosure pertains easily know that a configuration according to an embodiment describe in the present disclosure may be applied to a fixed terminal such as a digital display device, a desktop computer and a digital signage, except when applicable only to a mobile terminal.

Hereinafter, a display device according to embodiments of the present disclosure and a method for controlling the same will be described.

Figure 1:
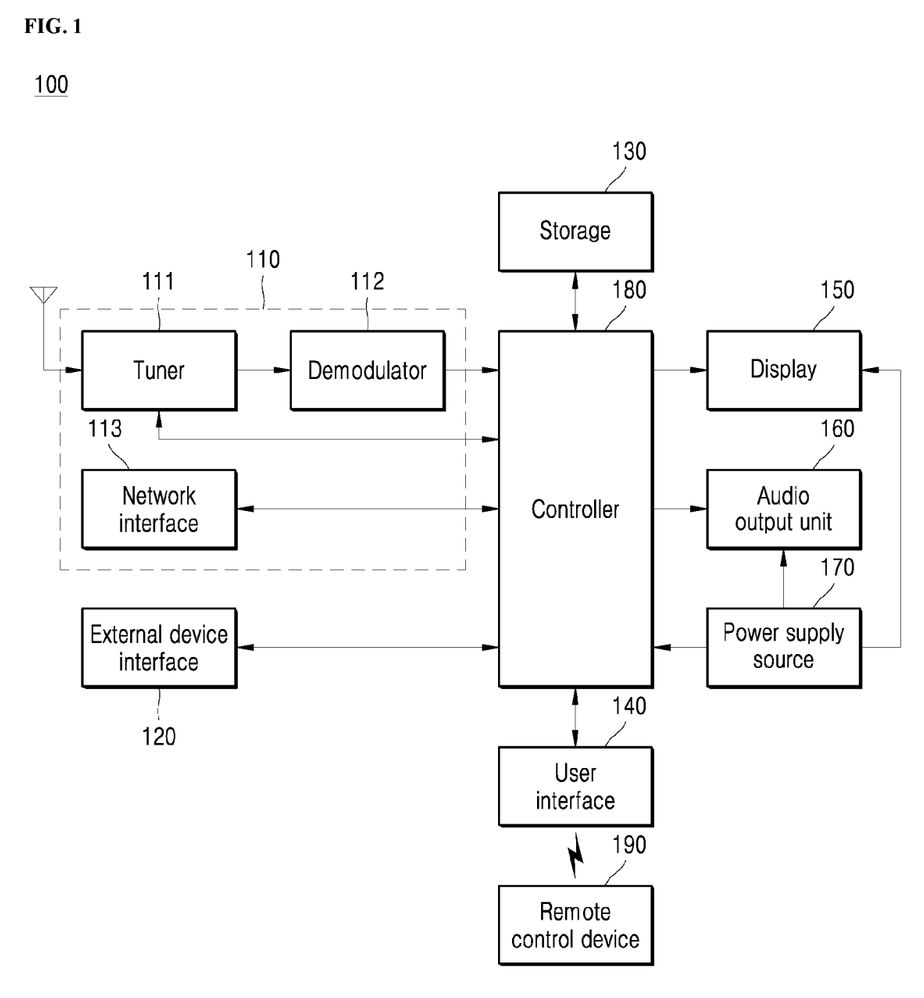
FIG. 1 is a view showing a schematic configuration of a digital device according to one embodiment.

FIG. 1 is a view showing a schematic configuration of a digital device according to one embodiment.

Referring to FIG. 1, the digital device 10 may include a broadcast receiver 110, an external device interface 120, a storage 130, a user interface 140, a display 150, an audio output unit 160, a power supply source 170 and a controller 180.

Here, the broadcast receiver 110 may include a tuner 111, a demodulator 112 and a network interface 113. In some examples, the broadcast receiver 110 may include the tuner 111 and the demodulator 112, but it may not include the network interface 113 and vice versa.

Although not shown in the drawings, the broadcast receiver 110 may include a multiplexer. In this instance, the multiplexer may multiplex a signal demodulated by the demodulator 112 and a signal received from the network interface 113. In addition, although not shown, the broadcast receiver 110 may also include a demultiplexer. The demultiplexer may demultiplex the multiplexed signal or the signal demodulated by the demodulator 112 or received from the network interface 113.

The tuner 111 may tune a specific radio frequency (RF) broadcast signal. The specific RF broadcast signal may correspond to a channel selected by a user or all channels previously stored. Also, the tuner 111 may convert the RF broadcast signal into intermediate frequency (IF) signal or a baseband signal.

For example, the tuner 111 may convert a RF broadcast signal that is a digital signal into a digital IF signal (DIF), and a RF broadcast signal that is an analog broadcast signal into an analog baseband video or audio signal (CVBS/SIF). In other words, the tuner 111 may process both a digital broadcast signal and an analog broadcast signal. The baseband video or audio signal (CVBS/SIF) may be directly input to the controller 180.

In addition, the tuner 111 may receive a RF broadcast signal of a single carrier or a multiple carrier. Meanwhile, the tuner 111 may sequentially tune and receive the RF broadcast signals of all broadcast channels stored based on a channel memory function, and convert them into intermediate frequency signals or baseband signals.

The demodulator 112 may receive and demodulate the digital IF signal converted by the tuner 111, and it may perform channel decoding. For that, the demodulator 112 may include a trellis decoder, a de-interleaver, a Reed-Solomon decoder. Or, the demodulator 112 may include a convolution decoder, a de-interleaver and a Reed-Solomon decoder.

The demodulator 112 may output a stream signal TS after performing demodulation and channel demodulation. At this time, the stream signal may be a signal in which a video signal, an audio signal or a data signal is multiplexed. As one example, the stream signal may be an MPEG-2 Transport Stream TS in which an MPEG-2 standard video signal, a Dolby AC-3 standard audio signal, etc. are multiplexed.

The stream signal output by the demodulator 112 may be input to the controller 180. The controller 180 may control demultiplexing, video/audio signal processing, etc. The controller 180 may control output of an image via the display 150 and output of audio via the audio output unit 160.

The external device interface 120 may provide an interface environment between the digital device 100 and various external devices.

The external device interface 120 may be connected to external devices such as a digital versatile disk (DVD), a blue-ray, a game device, a camera, a camcorder, a computer (or a laptop), a tablet PC, a smart phone, a Bluetooth device, a cloud and the like in a wired or wireless manner. The external device interface 120 may transmit a signal including data such as the processed image, video and audio input by the connected external device to the controller 180. The controller 180 may control the data signal including the processed image, video and audio to be output to the connected external device. For that, the external device interface 120 may further include an A/V input/output (not shown) or a wireless communication unit (not shown).

To input video and audio signals of the external device to the digital device 100, the A/V input/output may include a USB terminal, a composite video banking sync (CVBS) terminal, a component terminal, a S-video terminal (analog), a digital visual interface (DVI) terminal, a high definition multimedia interface (HDMI) terminal, a RGB terminal and D-SUB terminal.

The wireless communication unit may perform short-range wireless communication with another digital device. For example, the digital device 100 may be network-connected to another digital device based on a communication protocol such as Bluetooth, Radio Frequency Identification (RFID), Infrared Data Association (IrDA), Ultra Wideband (UWB), ZigBee, Digital Living Network Alliance (DLNA).

In addition, the external device interface 120 may be connected to the set-top-box (STB) and at least one of the above-described various terminals, and may perform input/output operations with the set-top-box (STB).

Meanwhile, the external device interface 120 may receive an application or an application list in an adjacent external device, and transmit the received application to the controller 180 or the storage 130.

The network interface 113 may provide an interface for connect the digital device 100 to a wired/wireless network. The network interface 113 may include an Ethernet terminal for the connection to a wired network. The network interface 113 may use communication standards such as Wireless LAN (WLAN), Wi-Fi, Wireless broadband (Wibro), World Interoperability for Microwave Access (Wimax) and High Speed Downlink Packet Access (HSDPA) for the connection to the wireless network.

The network interface 113 may transceive data with another digital device via the connected network or another network linked to the connected network. In particular, some content data stored in the digital device 100 may be transmitted to a digital device selected from other previously registered digital devices.

The network interface 113 may access a predetermined web page via the connected network or another network linked to the connected network. Specifically, the network interface 113 may access a predetermined web page via the network and transmit or receive data with a corresponding server. In addition, the network interface 113 may receive content or data provided by a content provider or network operator. That is, content such as a movie, advertisement, a game, VOD and a broadcast signal and information related thereto provided by a content provider or a network provider may be received via the network. Firmware update information and an update file provided by a network operator may be received as well.

The network interface 113 may select and receive a desired application from applications open via the network.

The storage 130 may store a program for processing and control of each signal in the controller 180. The storage may also store a signal-processed video, audio or data signal.

The storage 130 may temporarily store a video, audio or data signal input from the external device interface 120 or the network interface 113. The storage 130 may store information about a predetermined broadcast channel based on a channel storage function.

The storage 130 may store an application or application list that is input from the external device interface 120 or the network interface 330.

The storage 130 may store various platforms which will be described below.

For example, the storage 130 may include at least one storage medium type of a flash memory type, a hard disk type, a multimedia card micro type, a card type memory (e.g., SD or XD memory, etc.) RAM or ROM (e.g., EEPROM, etc.). The digital device 100 may reproduce content files (e.g., movie files, still image files, music files, document files and application files), and provide them to the user.

Meanwhile, the storage 130 may be provided in the controller 180 or may be provided separately from the controller 180.

The user input interface 140 may be configured to transmit a signal input by the user to the controller 180 or transmit a signal from the controller 180 to the user.

For example, the user input interface unit 140 may be connected to a remote control device 190 based on various communication methods such as RF communication and IR communication. The user input interface 140 may receive and process a control signal for power on/off, channel selection and screen setting that is transmitted from the remote control device 190, or transmit a control signal from the controller 180 to the remote control device 500. In addition, the user input interface 140 may transmit control signals input from local keys (not shown) including a power key, a channel key, a volume key, a setting key, etc to the controller 180.

The user input interface 140 may transmit a control signal input from a sensor (not shown) configured to sense a user's gesture to the control unit 180, or transmit a signal from the controller 180 to the sensor (not shown). Here, the sensor (not shown) may include a touch sensor, a voice sensor, a position sensor, a motion sensor, etc.

The controller 180 may demultiplex a stream input through the tuner 111, the demodulator 112 or the external device interface 120, or process a demultiplexed signal to generate and output a video or audio.

The video signal processed by the controller 180 may be input to the display 150 to be displayed as an image corresponding to the video signal. The video signal image-processed by the controller 180 may be input to an external output device via the external device interface 120.

The audio signal processed by the controller 180 may be output to the audio output unit 160. The audio signal sound-processed by the controller 180 may be input to an external output device via the external device interface 120.

Meanwhile, the controller 180 may include a demultiplexer and an image processor.

The controller 180 may be configured to control the overall operation of the digital device 100. For example, the controller 180 may control the tuner 111 to tune a RF broadcast corresponding to a channel selected by the user or previously stored therein.

The controller 180 may control the digital device 100 based on a user command input via the user input interface 140 or an internal program. In particular, the controller 180 may control an application or application list desired by the user to be downloaded in the digital device 100 by accessing the network.

As one example, the controller 180 may control the tuner 111 to input a signal of a channel selected based on a predetermined channel selection command received via the user input interface 140. After that, the controller 180 may process a video, audio or data signal of the selected channel. The controller 180 may control the channel information selected by the user to be output to the display 150 or the audio output unit 160 together with the processed video or audio signal.

As another example, the controller 180 may control a video or audio signal transmitted by an external device to be output via the display 150 or the audio output unit 160 based on an external device video playing command received via the user input interface 140.

Meanwhile, the controller 180 may control the display 150 to display videos. For example, the display 150 may be controlled to display a broadcast video input via the tuner 111, an external input video input via the external device interface 120, a video input via the network interface or a video stored in the storage 130. At this time, the video displayed on the display 150 may be a still image or a moving image, and may be a 2D image or a 3D image.

In addition, the controller 180 may control the display 150 to play content. The content may be a content stored in the digital device 100 or an external input content input from an external device. The content may be at least one of a broadcast video, an external input video, an audio file, a still image, a connected web screen or a document file.

Meanwhile, when entering an application view item, the controller 180 may control the display 150 to display an application or application list in the digital device 100 or allowed to be downloaded from an external network.

The controller 180 may control to install and execute the application downloaded from the external network with various user interfaces. In addition, the controller 180 may control images related to the application executed based on the user's selection to be displayed on the display 150.

Although not shown in the drawings, a channel browsing processor configured to generate a thumb-nail image corresponding to a channel signal or an external input signal may be further provided.

The channel browsing processor may receive a stream signal output from the demodulator 320 or a stream signal output from the external device interface 120. The channel browsing processor may extract an image from the input stream signal and generate a thumbnail image. The generated thumbnail image may be input to the controller 180 as it is or encoded. Or, the generated thumbnail image may be encoded into a stream and input to the controller 180. The controller 180 may control the display 150 to display a thumbnail list including a plurality of thumbnail images by using the input thumbnail image. Thumbnail images in the thumbnail list may be updated sequentially or simultaneously. Accordingly, the user can easily grasp the contents of the plural broadcast channels.

The display 150 may convert a video signal, a data signal and an OSD signal that are processed by the controller 180 or a video signal and a data signal that are received from the external device interface 120 into respective R, G, B signals to generate drive signals.

The display 150 may include a PDP display, a LCD display, an OLED display, a flexible display, a 3D display, etc.

Meanwhile, the display 150 may be configured as a touch screen and may be used as an input device in addition to an output device.

The audio output unit 160 may receive a signal audio-processed by the controller 180 (e.g., a stereo signal, a 3.1 channel signal and a 5.1 channel signal) to output an audio signal based on the received signal. The audio output unit 160 may be realized by various types of speakers.

Meanwhile, to sense a user's gesture, the digital device 100 may further include a sensor (not shown) including at least one of a touch sensor, an audio sensor, a position sensor or an operation sensor as described above. A signal sensed by the sensor (not shown) may be transmitted to the controller 180 via the user input interface 140.

A photographing unit (not shown) configured to photograph a user may be further provided. Information about the image photographed by the photographing unit (not shown) may be input to the controller 180.

The controller 180 may be configured to sense a user's gesture based on the image photographed by the photographing unit (not shown) or the signal sensed by the sensor (not shown) or combination of them.

The power supply 170 may be configured to supply power to each element provided in the digital device 100. In particular, the power supply source 170 may supply power to the controller 180 realized by a system on chip (Soc), the display 150 configured to display an image and the audio output unit 160 configured to output an audio.

For that, the power supply 170 may include a converter (not shown) configured to convert AC power into DC power. When the display 150 is a liquid crystal panel including a plurality of backlight lamps, an inverter (not shown) configured to perform Pulse Width Modulation (PWM) operation for luminance variation or dimming drive may be further provided.

The digital device 100 may be a digital broadcast receiver configured to process a digital broadcast signal based on mounted-type or mobile ATSC or a DVB.

In addition, the digital device 100 may omit some elements from among the elements shown in the drawings as needed or may further include elements not shown in the drawings. Unlike the above, the digital device 100 may receive and play content via the network interface or the external device interface, without the tuner and the demodulator.

Two different types of electronic devices A and B may transceive data in a streaming manner. In this instance, normal data processing may be possible only when data is transceived at a preset rate that is mutually agreed by two electronic devices. To this end, electronic devices generally use a clock generator mounted therein. However, no matter how sophisticated the clock generator is, there are performance variations and differences due to the characteristics of hardware components, which is shown in FIG. 2.

Figure 2:
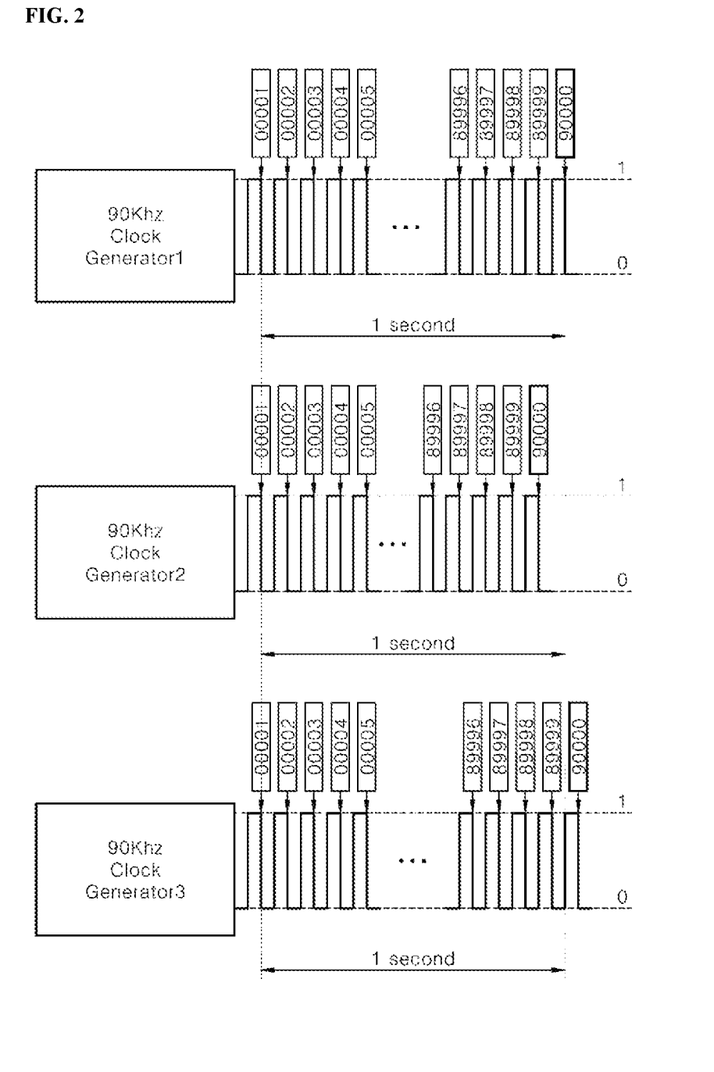
FIG. 2 is a view to describe a concept of an operation of a clock generator.

Referring to FIG. 2, due to a process problem, three clock generators generating clocks at a clock rate of 90 kHz may generate different numbers of clocks at the same time. That is, no matter how high performance the clock generator has, the number of clocks generated at the time is inevitably different. When different types of electronic devices transceive data with each other, a communication error could occur due to clock mismatch. To solve such disadvantages may be used a method in which one electronic device tranceives data in synchronization with the clock of another electronic device.

Hereinafter, an electronic device and a method for controlling the same according to one embodiment of the present disclosure will be described with reference to the above description.

Figure 3:
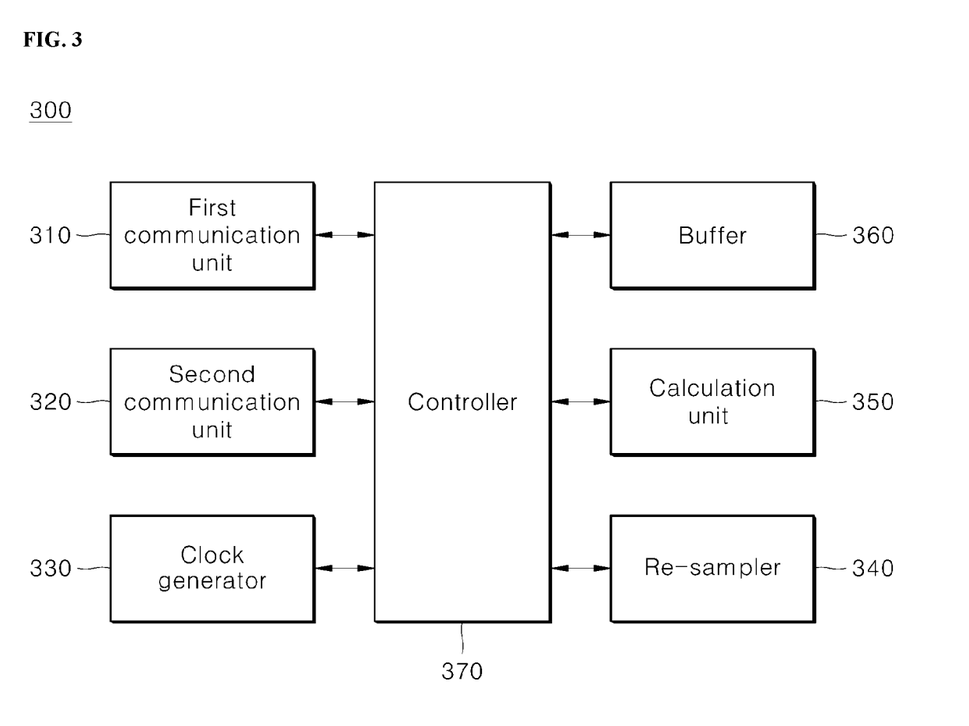
FIG. 3 is a view showing a schematic configuration of a digital device according to one embodiment.

FIG. 3 is a view showing a schematic configuration of a digital device according to one embodiment.

Referring to FIG. 3, an electronic device 300 may be a device is a device that performs a function of transmitting data received from a first external electronic device to a second electronic device. The electronic device 300 may include a first communication unit 310, a second communication unit 320, a clock generator 330, a re-sampler 340, a calculation unit 350, a buffer 360 and a controller 370.

Meanwhile, the electronic device 300 may be a display device and it may be a TV as one example. For convenience of description, examples of the present disclosure will be described assuming that the electronic device 300 is a TV. However, the present disclosure may not be limited thereto.

Hereinafter, the function of each element will be described in detail.

The first communication unit 310 may be configured to perform communication with a first external electronic device based on a first protocol. As communication is performed, the electronic device 300 may receive data, for example, video data and audio data from the first external electronic device. Meanwhile, the first external electronic device may include a communication module corresponding to the first communication unit 310.

The second communication unit 320 may be configured to perform communication with a second external electronic device based on a second protocol. As communication is performed, the electronic device 300 may receive data, for example, video data and audio data from the second external electronic device. Meanwhile, the second external electronic device may include a communication module corresponding to the second communication unit 320.

In this instance, the first protocol and the second protocol may be protocols of different standards. The first protocol and the second protocol may be applied to wired communication.

Figure 4:
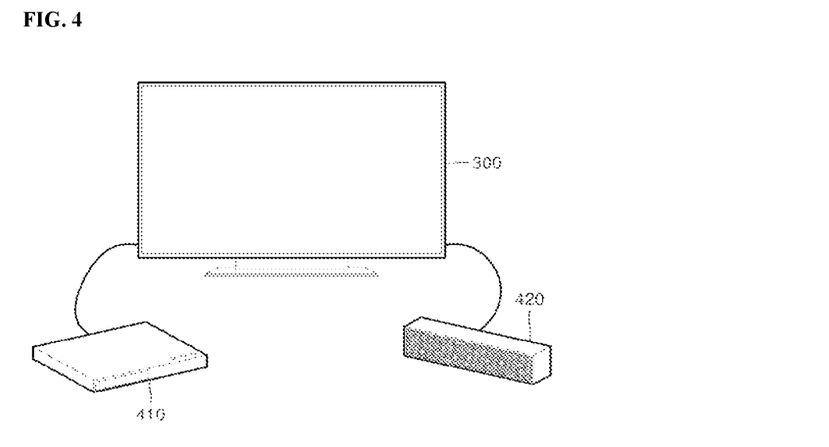
FIG. 4 is a view showing a concept in which a first external electronic device and a second external electronic device are connected to an electronic device according to the present disclosure by communication.

As one example, referring to FIG. 4, when the electronic device 300 is a TV, the first external device 410 may be a Blu-ray player and the second external electronic device 420 may be an external speaker. The first protocol used in communication between the Blu-ray player and the TV may be High Definition Multimedia Interface (HDMI) protocol. The second protocol used in communication between the TV and the external speaker may be Universal Serial Bus (USB) protocol. The first communication unit 310 may be a HDMI communication unit including a HDMI mounted in the TV. The second communication unit 310 may be a USB communication unit including a USB interface mounted in the TV.

The clock generator 330 may be configured to generate a clock needed to operate the electronic device 300. Meanwhile, the first external electronic device and the second external electronic device may also include a clock generator.

As one example, when a clock frequency is 90 kHz, the clock generator 330 may generate a pulse of 0 or 1 90000 times for 1 second for each cycle.

Meanwhile, during the communication based on the first protocol, the first external electronic device and the electronic device 300 may be synchronized based on the clock of the first external electronic device 300. Specifically, the electronic device 300 may perform the first protocol-based communication with reference to clock information of the first external electronic device. During the communication based on the second protocol, the second external electronic device and the electronic device may be synchronized based on the clock of the second external electronic device. Specifically, the second external electronic device may perform the second protocol-based communication with reference to clock information of the electronic device 300.

The re-sampler 340 may be configured to re-sample data received from the first external electronic device.

As one example, the received data may be data from which video data and audio data are sampled, and the re-sampler 340 may re-sample the audio data.

Re-sampling means re-sampling by changing a set value after restoring the sampled data. As described below, the capacity of data streamed by re-sampling may be adjusted.

The calculation unit 350 may be configured to calculate a set value required for sampling. The setting value may include a re-sampling period value.

In one example of the present disclosure, the calculation unit 340 may calculate a set value of re-sampling based on a rate difference value between the clock rate of the first external electronic device and the clock rate of the electronic device 300.

To calculate the rate difference between the clock rates rapidly and precisely, the calculation unit 340 may calculate the set value of re-sampling based on a data transmission rate to the second external electronic device, a first time value and a second time value.

The first time value may be calculated based on a clock count value of the first external electronic device at each of the first time point and the second time point and the clock rate of the first external electronic device. The electronic device 300 may know information related to the clock of the first external electronic device as described above, so that the electronic device 300 may perform the above-mentioned operation. The second time value may be calculated based on a clock count value of the first electronic device 300 at each of the first time point and the second time point and a clock rate of the first external electronic device. That will be described in detail below.

The buffer 360 may be configured to store the re-sampled data. The second communication unit 320 may transmit the re-sampled data stored in the buffer 360 to the second external electronic device.

Meanwhile, the buffer 360 may have a reference value related to the amount of stored data, and the calculation unit 350 may monitor the reference value of the buffer 360 to finely adjust the calculated re-sampling set value. That will also be described below.

The controller 370 may be configured to control operations of other elements provided in the electronic device 300.

At least one of the re-sampler 340, the calculation unit 350 or the controller 370 may be implemented as a module in the processor provided in the electronic device 300. Here, the processor may include one or more of a CPU, an application processor and a communication processor. The module may mean a functional and structural combination of hardware for carrying out the technical idea of the present disclosure and software for driving the hardware. For example, the module may mean a logical unit of a predetermined code and a hardware resource for executing the predetermined code.

The electronic device 300 according to the present disclosure will be described with reference to what is described above.

The electronic device 300 may be a device configured to transmit data received from the first external electronic device to the second external electronic device. At this time, the protocol (i.e., the first protocol) used by the first external electronic device and the electronic device 300 may be different from the protocol (i.e., the second protocol) used by the electronic device 300 and the second external electronic device. In this instance, a rate difference might occur in the process of transmitting the data transceived by the first external electronic device and the electronic device 300 to the second external electronic device in real time. That is, the second external electronic device may be synchronized to the clock rate of the electronic device 300 and the electronic device 300 may be synchronized to the clock rate of the first external electronic device, so that there might be a rate difference during the process of transmitting the data. Accordingly, an error might occur in the data streaming process due to a difference between the clock of the first external electronic device and the clock of the second external electronic device.

As one example, it is assumed the electronic device 300 is a TV configured to stream audio data transmitted from the Bue-ray player to an external speaker. The Blu-ray player and the TV may be connected to communicate with each other via HDMI protocol, and the external speaker and the TV may be connected to communicate with each other via USB protocol. In this instance, the external speaker may be synchronized to the clock of the TV based on the synchronization method of the USB protocol, but the audio data substantially transmitted by the TV may be transmitted at a rate synchronized with the clock of the Blu-ray player by the HDMI protocol.

Accordingly, in the process of three different devices streaming audio data, the buffer 360 configured to transmit the audio data may become an under run state or an over run state based on a rate deviation. An error might occur in the data streaming process due to a difference between the clock of the first external electronic device and the clock of the second external electronic device.

The electronic device 300 according to the present disclosure may re-sample the data received from the first external electronic device based on a rate difference between the clock rate of the first external electronic device and the clock rate of the electronic device 300, and transmit the re-sampled data to the second external electronic device. Accordingly, the present disclosure may implement streaming without the error.

Hereinafter, the streaming operation of the electronic device 300, in particular, the operation of streaming audio data from the first external electronic device to the second external electronic device will be described in detail.

Figure 5:
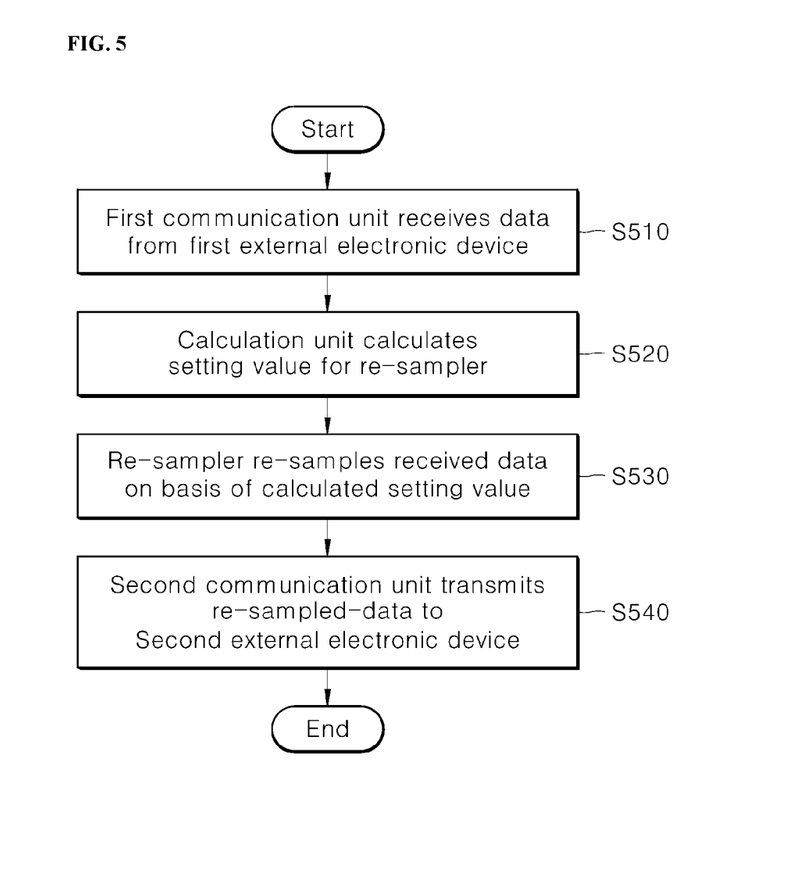
FIG. 5 is a flow chart showing a method for controlling the electronic device according to one embodiment.

FIG. 5 is a flow chart showing a method for controlling the electronic device 300 according to one embodiment.

Here, the method for controlling the electronic device 300 may be a method for controlling the operation of the electronic device 300 configured to transmit data received from the first external electronic device to the second external electronic device.

As mentioned above, the electronic device 300 may be synchronized to the clock of the first external electronic device to receive data. Accordingly, it is assumed that the electronic device 300 knows a clock count value of the clock generator provided in the first external electronic device. It is also assumed that a count value of a clock generated in the clock generator of the first external electronic device and the clock generator 330 of the electronic device 300 continuously increases and that the electronic device 300 may inquire a count value at a necessary time.

Hereinafter, each operation performed in each step of the control method will be described.

In S510, the first communication unit 310 may receive data from the first external electronic device.

At this time, the first communication unit 310 may receive data via communication based on the first protocol. The received data may be sampled data.

In S520, the calculation unit 350 may calculate a set value of the re-sampler 340.

Here, the set value of the re-sampler 340 may be equal to a period value of re-sampling.

When a period value of re-sampling is changed, the size of data may be changed. As one example, when the re-sampling period value is greater than a period value of the received original data sampling, the size of the re-sampled data may be greater than that of the original data. Conversely, when the re-sampling period value is smaller than the period value of the received original data sampling, the size of the re-sampled data may be smaller than that of the original data.

According to an embodiment of the present disclosure, the calculation unit 350 may set a set value of re-sampling based on a rate difference between the clock rate of the first external electronic device In S530, the re-sampler 340 may re-sample the received data based on the calculated set value.

The re-sampled data may be stored in the buffer 360.

Meanwhile, the buffer 340 may become a under run state based on the amount of the stored data or an over run state. The over run state is a state in which the amount of the re-sampled data stored in the buffer 360 is above a reference value. The under run state is a state in which amount of the re-sampled data stored in the buffer 360 is below the reference value. As one example, the reference value may be half the capacity of the buffer 360.

In S540, the second communication unit 320 may transmit the re-sampled data to the second external electronic device.

At this time, the second communication unit 320 may transmit data via communication based on the second protocol.

In brief, the performance of re-sampling may change the size of data transmitted by the electronic device 300 and the electronic device 300 may transmit the re-sampled data to the second external electronic device. Accordingly, although three different types of electronic devices have different time references, there may be no problem with streaming data. Through this, the user may listen to uninterrupted audio.

Meanwhile, steps of FIG. 5 may be performed irrespective of the order, and the steps may be performed simultaneously. In addition, the operations of steps may be implemented by both hardware and software.

As described above, the calculation unit 350 may set a set value of re-sampling based on a rate difference between the clock rate of the first external electronic device and that of the electronic device 300.

In this instance, the rate difference between the clock rate of the first external electronic device and the clock rate of the electronic device 300 may be calculated based on a first time value and a second time value.

The first time value may be calculated based on a clock count value of the first external electronic device at a first time point and a clock count value of the first external electronic device at a second time point. As one example, the first time value may be equal to a value obtained by dividing a difference between the clock count value of the first external electronic device at the first point and that of the first external electronic device at the second point by the clock rate of the first external electronic device.

The second time value may be calculated based on a clock count value of the electronic device 300 at the first time point, a clock count value of the electronic device 300 and a clock rate of the electronic device 300. As one example, the second time value may be equal to a value obtained by dividing a difference between the clock count value of the electronic device 300 at the first point and that of the electronic device 300 at the second point by the clock rate of the electronic device 300.

The first time value, the second time value and the re-sampling set value may be expressed as following equations:

$$A_{time} = \frac{A_{count,t2} - A_{count,t1}}{A_{clockrate}} \quad \text{[Equation 1]}$$

$$B_{time} = \frac{B_{count,t2} - B_{count,t1}}{B_{clockrate}} \quad \text{[Equation 2]}$$

$$Set\_value_{resample} = (\text{data transmission rate})\frac{B_{time}}{A_{time}} \quad \text{[Equation 3]}$$

Here, A means the first the first external electronic device, B means the electronic device 300 and $A_{time}$ means the first time value $A_{count,t1}$ means the clock count value of the first external electronic device at the first time point and $A_{count,t2}$ means the clock count value of the first external electronic device at the second time point, $A_{clockrate}$ means the clock rate of the first external electronic device, $B_{time}$ means the second time value, Bcount,t1 means the clock count value of the electronic device 300 at the second time point, $B_{clockrate}$ means the clock rate of the electronic device, and $Set\_value_{re-sample}$ Referring to the above description, the first time value $A_{time}$ and the second time value $B_{time}$ may have similar but different values, and the difference between the two values may be equal to a deviation between the clock generator of the first external electronic device and the clock generator 330 of the electronic device 300. The first time value and the second time value may be used in calculating a time deviation rate between the first external electronic device and the electronic device 300. The calculated time deviation rate may be a set value of re-sampling. Accordingly, the electronic device 300 may transmit data that is reconfigured based on the time of the electronic device 300 to the second external electronic device.

As one example, it is assumed that a clock frequency of the clock generator provided in the first external electronic device is 90 kHz and that a clock frequency of the clock generator 330 provided in the electronic device 300 is 48 kHz. At this time, it is assumed that a clock count value of the first external electronic device is 1710012 and that a clock count value of the electronic device 300 is 5811003. It is also assumed that a clock count value of the first external electronic device is 2610068 and a clock count value of the electronic device 300 is 6291003, at the second time point which is 10 seconds after the first time point.

In this instance, the calculation unit 350 may calculate the first time value as 10.00062222 and the second time value as 10.00000000.

At this time, the rate of data streamed from the first external electronic device to the electronic device 300 may be slightly faster than the rate of data streamed from the electronic device 300 to the second external electronic device. If data streaming (e.g., audio data) continues in this state, the buffer 360 provided in the electronic device 300 might become in an over run state.

Accordingly, the calculation unit 350 may change the size of the data by re-sampling the data based on Equation 3 above, so that the amount of data stored in the buffer 360 may be prevented, thereby preventing the over run state and the under run state of the buffer 360. When the data is audio data, the user may listen to audio without interruption.

Meanwhile, the set value of the re-sampler calculated in S520 may be close to an actual rate difference, but it may not be a perfect value.

That is, the electronic device 300 may also perform other service operations in addition to the communication operation, and a delay might occur when each clock count value for the first external electronic device and the electronic device 300 is inquired according to the other service operations. Since the count value increases even in a delay section, an error might occur in the finally calculated re-sampling set value. Referring to FIG. 3, a value of $B_{time}/A_{time}$ may be an integer value or a non-integer value. If the value is a non-integer value, a decimal point value below the value of $B_{time}/A_{time}$ is discarded and an error might occur in the finally calculated re-sampling set value.

To solve the first disadvantage mentioned above, the calculation unit 350 according to an embodiment of the present disclosure may update the re-sampling set value by repeating the operation of the calculating the re-sampling set value a plurality of times.

More specifically, when inquiring a clock count value of the electronic device 300 with the clock rate of 90 kHz every 1 second, the clock count value may be ideally inquired as 90000 at the first time point, 18000 at the second time point, and 27000 at the third time point.

However, the ideal value may not be inquired in the actual operating environment due to the load of the system or other environmental causes, but an error might be inquired.

Figure 6:
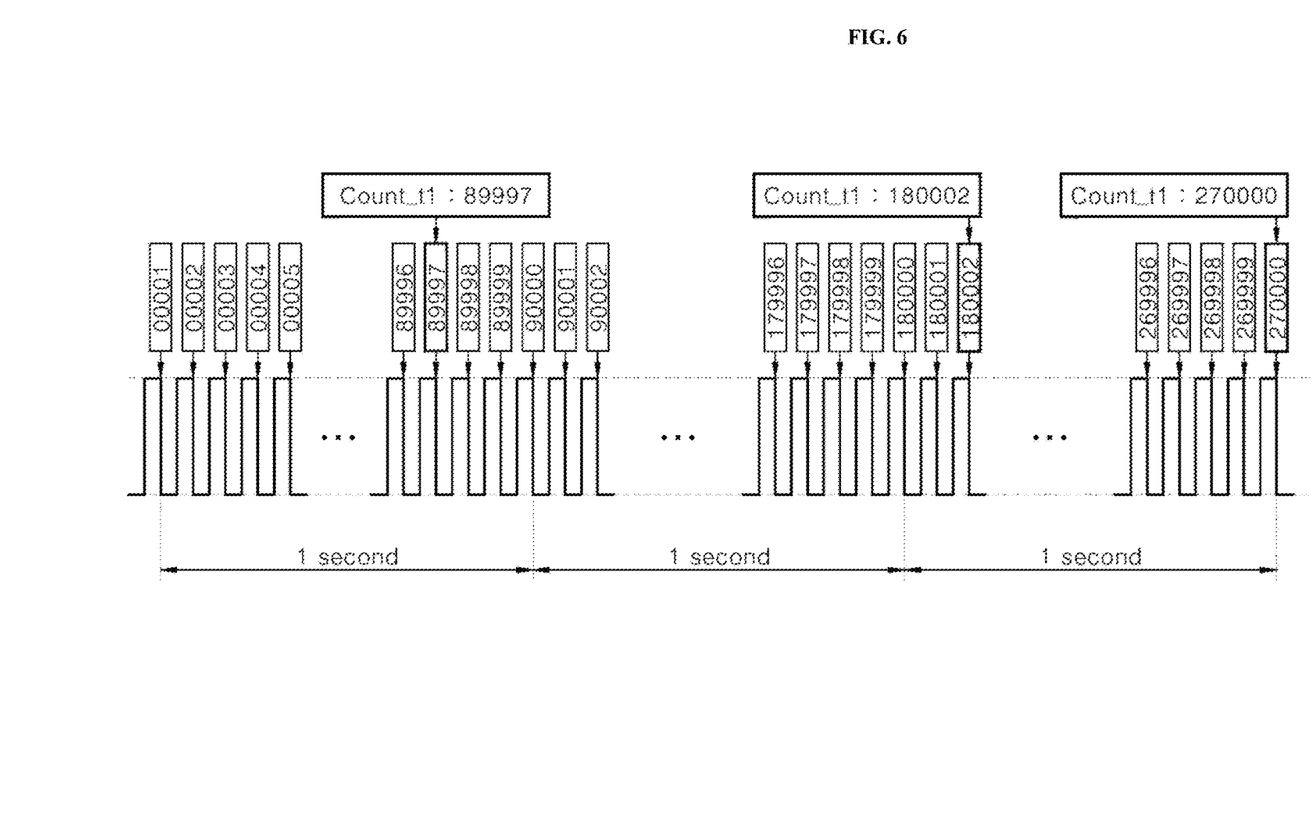
FIGS. 6 and 7 are views to describe a concept of an operation of an electronic device according to one embodiment.

As one example, a clock count value shown in FIG. 6 in which an error occurred may be inquired. In this instance, the clock count value may be inquired as 89997 at the first time point, 180002 at the second time point, and 270000 at the third time point. A time value at each time pint may be expressed as shown in Equations 4 to 6 below.

$A_{time}=(89997-0)/90000=0.9999666666666666666666666666667$ [Equation 4]

$B_{time}=(180002-89997)/90000=1.0000555555555555555555555555556$ [Equation 5]

$C_{time}=(270000-180002)/90000=0.9999777777777777777777777777778$ [Equation 6]

However, when $A_{time}$, $B_{time}$ and $C_{time}$ are all summed up, it may become 3.0000000000000000000000000000001, which is similar to the ideal When using only the clock count value inquired in one cycle, a time value including an error may be calculated. However, when the above operation is periodically repeated to update the re-sampling set value, the error may be reduced. Accordingly, the calculation unit 350 may update the re-sampling set value by repeating the operation of calculating the re-sampling set value a plurality of times.

In addition, to solve the second disadvantage mentioned above, the calculation unit 350 according to an embodiment of the present disclosure may finely tune the calculated set value of re-sampling by monitoring the buffer 360.

More specifically, when a non-integer value of $B_{time}/A_{time}$ is input, the lower decimal point value may be discarded. When the value of discarded decimal point accumulates for a long time, the buffer 360 may be in the over run state or the under run state.

Accordingly, the calculation unit 350 may continuously monitor the state of the buffer 360 and determine whether the buffer 360 is in the over run state or the under run state based on the result of monitoring, thereby fine-adjusting the set value of re-sampling based on the result of determination.

In other words, the calculation unit 350 may monitor the amount of re-sampled data stored in the buffer 360 when calculating the set value of re-sampling. At this time, when the amount of re-sampled data stored in the buffer 360 is the over-run state, the calculation unit 350 may fine-adjust the amount of data to reduce the calculated set value of re-sampling. When the amount of re-sampled data stored in the buffer 360 is the under run state, the calculation unit 350 may fine-adjust the data amount to reduce the calculated set value of re-sampling.

Here, the set value of re-sampling may be calculated based on a predefined basic unit, and the operation of fine-adjusting may be an operation of increasing or decreasing the basic unit of the set value by 1.

Meanwhile, referring to FIG. 7, the concept of monitoring the state of the buffer 360 will be described.

A process of writing data to the buffer 360 based on the first protocol may be affected by a writing period and the size of data to be written. In addition, a process of reading data written to the buffer 360 may be also affected by a reading period and the size of data to be read.

Figure 7:
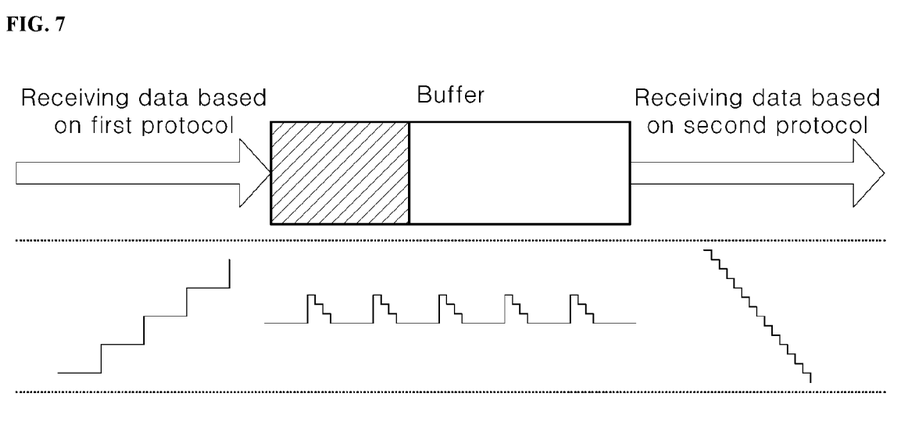

Accordingly, the writing period and the size of data in the buffer 360 may be different from the data reading period and the size of data, which is shown in FIG. 7. When data is written and read in real time, the amount of data stored in the buffer 360 may be shown in a graph shown in the middle of FIG. 7. When data stored in the buffer 360 is changing in real time, it is impossible to determine a rate difference between the writing rate and the reading rate within a short time.

However, the calculation unit 350 according to the present disclosure may set and monitor a reference value of the buffer 360, thereby quickly identify whether the buffer 360 is the over run state or the under run state.

In other words, the electronic device 300 and the method for controlling the electronic device 300 according to the present disclosure may prevent a delay occurring when the data received from the first external electronic device is transmitted to the second external electronic device. Also, even when there is a performance deviation of the clock elements, the electronic device 300 and the method for controlling the electronic device 300 according to the present disclosure may perform streaming without delay.

Even though all the components of the embodiments in the present disclosure are described as being combined into one component or operating in combination, embodiments are not limited to the embodiments set forth herein, and all the components can be selectively combined to operate within the scope of the purpose of the disclosure. All the components can be respectively implemented as an independent hardware, or some or all of the components can be selectively combined and can be embodied as a computer program including a program module that performs some or all functions combined into one or more hardwares. Codes or code segments of the computer program can be easily inferred by those skilled in the art. The computer program can be stored in a computer-readable recording medium and can be read and executed by a computer, whereby the embodiments in the disclosure can be realized. Examples of a storage medium of the computer program include storage mediums including a magnetic recording medium, an optical recording medium and a semiconductor recording element. The computer program for realizing the embodiments in the disclosure includes a program module which is transmitted via an external device in real time.

The embodiments are described above with reference to a number of illustrative embodiments thereof. However, the present disclosure is not intended to limit the embodiments and drawings set forth herein, and numerous other modifications and embodiments can be devised by one skilled in the art. Further, the effects and predictable effects based on the configurations in the disclosure are to be included within the range of the disclosure though not explicitly described in the description of the embodiments.

The invention claimed is:

1. An electronic device configured to transmit data received from a first external electronic device to a second external electronic device, the electronic device comprising:
   a first communication unit configured to receive data from the first external electronic device via communication based on a first protocol;
   a re-sampler configured to re-sample the received data;
   a second communication unit configured to transmit the re-sampled data via communication with the second external electronic device based on a second protocol different from the first protocol;
   a calculation unit configured to calculate a set value of the re-sampling based on a data transmission rate to the second external electronic device, a first time value and a second time value,
   wherein the first time value is calculated by dividing a difference between a clock count value of the first external electronic device at a first time point and the clock count value of the first external electronic device at a second time point by a clock rate of the first external electronic device, the second time value is calculated by dividing a difference between a clock count value of the electronic device at the first time point and the clock count value of the electronic device at the second time point by a clock rate of the electronic device, and the set value of the re-sampling is calculated by multiplying the data transmission rate to the second external electronic device, and a quotient resulting from dividing the second time value by the first time value; and a buffer configured to store the re-sampled data, wherein the calculation unit is further configured to:

monitor an amount of the re-sampled data stored in the buffer;

finely adjust the set value of the re-sampling by increasing or decreasing a basic unit of an input value of the re-sampler by 1 according to the amount of the re-sampled data; and update the set value of the re-sampling by periodically repeating the calculation of the set value of the re-sampling.

2. The electronic device of claim 1, wherein the set value of the re-sampling comprises a period value of the re-sampling.

3. The electronic device of claim 1, wherein the first external electronic device and the electronic device are synchronized to each other based on a clock of the first external electronic device, and the electronic device and the second external electronic device are synchronized to each other based on a clock of the electronic device.

4. The electronic device of claim 1, wherein the data is audio data.

5. The electronic device of claim 1, wherein the calculation unit updates the set value of the re-sampling by repeating the operation of calculating the set value of the re-sampling a plurality of times.

6. The electronic device of claim 1, when the amount of the stored re-sampled data is an over run state, the calculation unit finely adjusts the calculated set value of the re-sampling to be decreased, and when the amount of the stored re-sampled data is an under run state, the calculation unit finely adjusts the calculated set value of the re-sampling to be decreased.

7. The electronic device of claim 6, wherein the over run state is a state in which the amount of the re-sampled data stored in the buffer is above a preset reference value, and the under run state is a state in which the amount of the re-sampled data stored in the buffer is below a preset reference value.

8. The electronic device of claim 1, wherein the first protocol and the second protocol are protocols applied to wired communication, and the electronic device is a video display device.

9. A method for controlling an electronic device configured to transmit data received from a first external electronic device to a second external electronic device, the method comprising:

receiving, by a first communication unit of the electronic device, data from the first external electronic device via communication based on a first protocol;

calculating, by a calculation unit of the electronic device, a set value of the re-sampling based on a data transmission rate to the second external electronic device, a first time value and a second time value;

re-sampling, by a re-sampler of the electronic device, the received data based on a set value of the re-sampling;

transmitting, by a second communication unit of the electronic device, the re-sampled data via communication with the second external electronic device based on a second protocol different from the first protocol, wherein the first time value is calculated by dividing a difference between a clock count value of the first external electronic device at a first time point and the clock count value of the first external electronic device at a second time point by a clock rate of the first external electronic device, wherein the second time value is calculated by dividing a difference between a clock count value of the electronic device at the first time point and the clock count value of the electronic device at the second time point by a clock rate of the electronic device, and wherein the set value of the re-sampling is calculated by multiplying the data transmission rate to the second external electronic device, and a quotient resulting from dividing the second time value by the first time value;

monitoring, by the calculation unit, an amount of the re-sampled data stored in a buffer;

finely adjusting, by the calculation unit, the set value of the re-sampling by increasing or decreasing a basic unit of an input value of the re-sampler by 1 according to the amount of the re-sampled data; and updating, by the calculation unit, the set value of the re-sampling by periodically repeating the calculation of the set value of the re-sampling.

* * * * *